US009584724B2

(12) United States Patent
Fetterhoff

(10) Patent No.: US 9,584,724 B2
(45) Date of Patent: Feb. 28, 2017

(54) ULTRA-WIDE FIELD OF VIEW SEEKER

(71) Applicant: Raytheon Company, Waltham, MA (US)

(72) Inventor: Ken A. Fetterhoff, Vail, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/285,251

(22) Filed: May 22, 2014

(65) Prior Publication Data

US 2015/0341553 A1 Nov. 26, 2015

(51) Int. Cl.
*H04N 5/225* (2006.01)
*H04N 5/232* (2006.01)

(52) U.S. Cl.
CPC .............................. *H04N 5/23238* (2013.01)

(58) Field of Classification Search
CPC .................. H04N 1/1048; H04N 3/06; H04N 2201/02431
USPC ........................................................ 348/374
See application file for complete search history.

(56) References Cited

U.S. PATENT DOCUMENTS 5,502,592 A 3/1996 Jamieson
2005/0078281 A1* 4/2005 Hatakeyama .......... G02B 15/14
353/69
2006/0217593 A1* 9/2006 Gilad ..................... A61B 1/0005
600/160
2007/0171366 A1* 7/2007 Su et al. ........................ 351/205
2010/0259667 A1* 10/2010 Yuan ....................... G02B 13/06
348/335
2012/0195045 A1* 8/2012 King ............................ 362/253
2013/0321668 A1* 12/2013 Kamath ............... H04N 5/2253
348/239

OTHER PUBLICATIONS

"Anamorphosis"; From Wikipedia, the Free Encyclopedia; http://en.wikipedia.org/w/index.php?title=Anamorphosis&oldid=638418693; modified Dec. 2014; 9 pages.

* cited by examiner

*Primary Examiner* — Usman Khan

(57) ABSTRACT

A system includes a seeker having a reflective surface of rotation, an image detector configured to capture images of a field of view, and an imaging lens group configured to provide the images of the field of view from the reflective surface of rotation onto the image detector. The system also includes an electronics unit configured to process the captured images. The reflective surface of rotation could distort the field of view in the captured images, and the electronics unit could remove distortions in the captured images caused by the reflective surface of rotation. The electronics unit could remove the distortions in the captured images using inverse reflective anamorphosis. The reflective surface of rotation could include a concave surface, a convex surface, a cylindrical surface, an inverted straight cone, a slice of a sphere containing an outer curved surface, or at least one reflective surface rotatable around an optical axis.

20 Claims, 7 Drawing Sheets

ULTRA-WIDE FIELD OF VIEW SEEKER

TECHNICAL FIELD

This disclosure is directed generally to seekers used, for example, in warheads. More specifically, this disclosure is directed to an ultra-wide field of view seeker.

BACKGROUND OF THE DISCLOSURE

As is generally known, imaging optics of a seeker mounted on a warhead are constrained by severe size, weight, and power (SWaP) limitations. These limitations impact the imaging capabilities of the seeker and, in particular, the field of view of the imaging optics. To obtain a wide field of view, techniques such as combining multiple camera images into a mosaic or using scanning optics are typically needed. Unfortunately, these techniques often require the use of devices that are bulky or consume large amounts of power. For instance, stitching scanned images together or combining images from multiple cameras often requires the use of computationally-intensive algorithms run in real-time that in turn require powerful processors. This often causes the devices to exceed the size, weight, and power budget allocated to the seeker.

SUMMARY OF THE DISCLOSURE

This disclosure provides an ultra-wide field of view seeker. According to a first embodiment of this disclosure, an ultra-wide field of view seeker includes a reflective surface of rotation, an image detector configured to capture images of the field of view, and an imaging lens group configured to provide the images of the field of view from the reflective surface of rotation onto the image detector.

According to a second embodiment of this disclosure, a system includes a seeker having a reflective surface of rotation, an image detector configured to capture images of a field of view, and an imaging lens group configured to provide the images of the field of view from the reflective surface of rotation onto the image detector. The system also includes an electronics unit configured to process the captured images.

According to a third embodiment of this disclosure, a method of using an ultra-wide field of view seeker includes receiving reflected light from a reflective surface of rotation, passing the reflected light through an imaging lens group to generate images of a field of view, and capturing the images of the field of view using an image detector.

Certain embodiments of this disclosure may provide various technical advantages depending on the implementation. For example, a technical advantage of some embodiments of this disclosure includes the ability to obtain a wide field of view with a stationary reflective surface or a rotating reflective surface. Another technical advantage of some embodiments of this disclosure includes the ability to use a combination of reflective optics, possibly with refractive optics at a tip of the reflective optics along an optical axis, to image an obscuration zone in the optical axis. In addition, yet another technical advantage of some embodiments of this disclosure includes the ability to select shapes of reflective surfaces of rotation based on the field of view requirements for a particular application.

Although specific advantages have been enumerated above, various embodiments may include none, one, some, or all of these enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Modern warheads have one or more seekers that serve to support guidance and control functions. The field of view of the seekers determines the precision and accuracy of target detection and navigation systems. As is known in the art, there are severe constraints in size, weight, and power to the optics and electronics in the seeker that limit the capabilities and field of view of the seeker.

Figure 1:
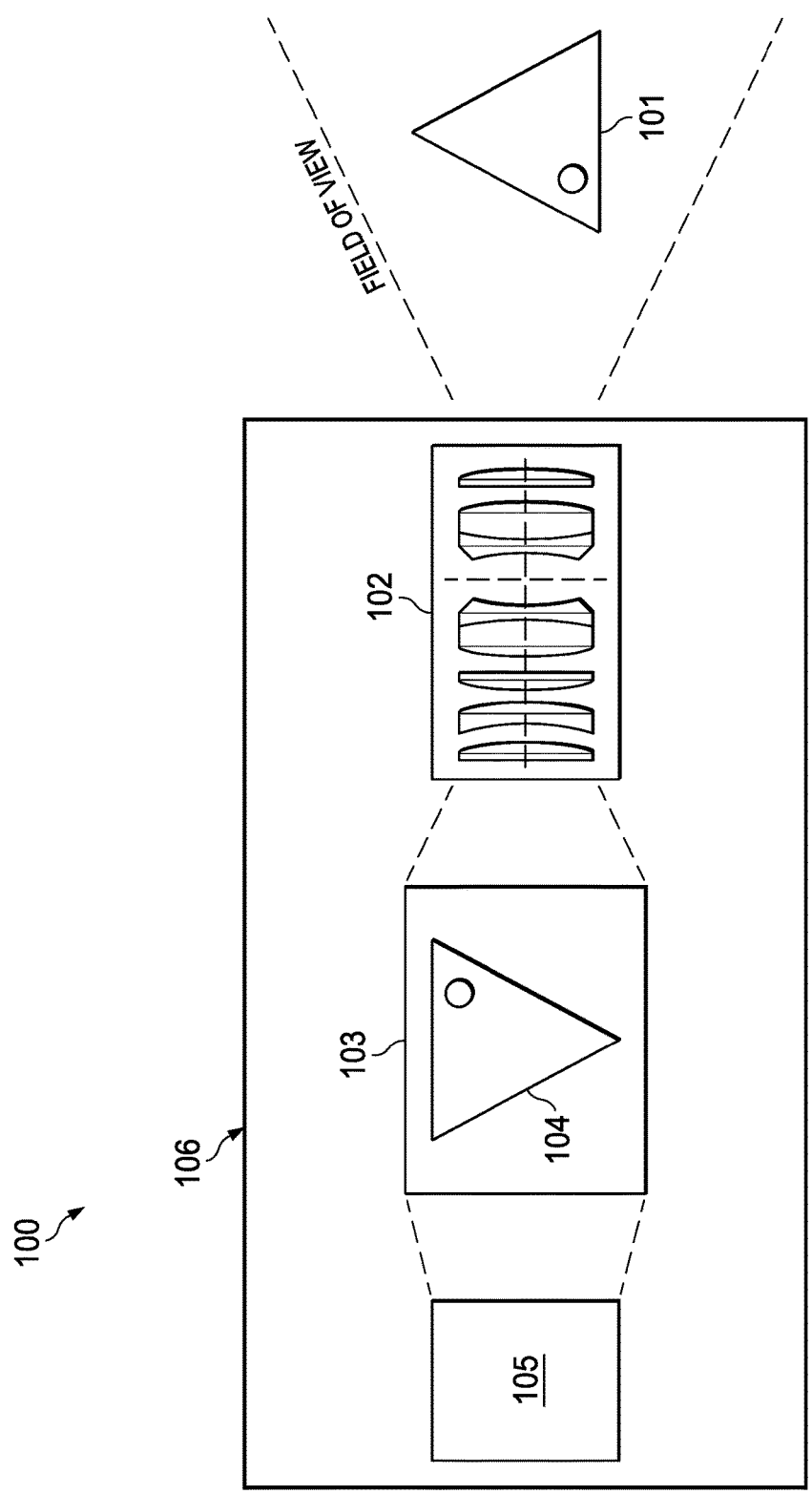
FIG. 1 illustrates a wide field of view seeker.

FIG. 1 illustrates a wide field of view seeker 100. The seeker 100 includes imaging optics 102, a detector array 103, back-end support electronics 105, and a stationary or moving platform or stage 106 that holds these elements. The detector array 103 includes any suitable array, such as a Focal Plane Array (FPA). The imaging optics 102 and the detector array 103 are lined up on an optical axis such that an object 101 forms an image 104 on the detector array 103. The field of view of the seeker 100 is finite, usually a small solid angle around the optical axis.

To increase the field of view, scanning and image stitching are often used. For example, the platform or stage 106 can be rotated to scan and capture multiple images 104, which are combined into a mosaic. This process of stitching images and forming a mosaic is often calculation-intensive and time-consuming. Alternatively, multiple cameras or seekers can be used to obtain multiple images concurrently, which are combined into a mosaic. Both the scanning platform and the multiple seekers approach require large size, weight, and power budgets.

To overcome these limitations, certain embodiments of this disclosure provide a seeker optical concept having a much larger field of view. For example, some embodiments of this disclosure provide a seeker having about a 360° viewing capability around one axis and about a nearly 180° viewing capability around another axis without having to stitch multiple images or use a moving platform or stage. For example, the inverse of the concept of reflective anamorphosis can be used by a seeker. Reflective anamorphosis is used in the field of art, where an image is drawn skewed so that the image appears correct when viewed using a specifically shaped mirror.

Figure 2A:
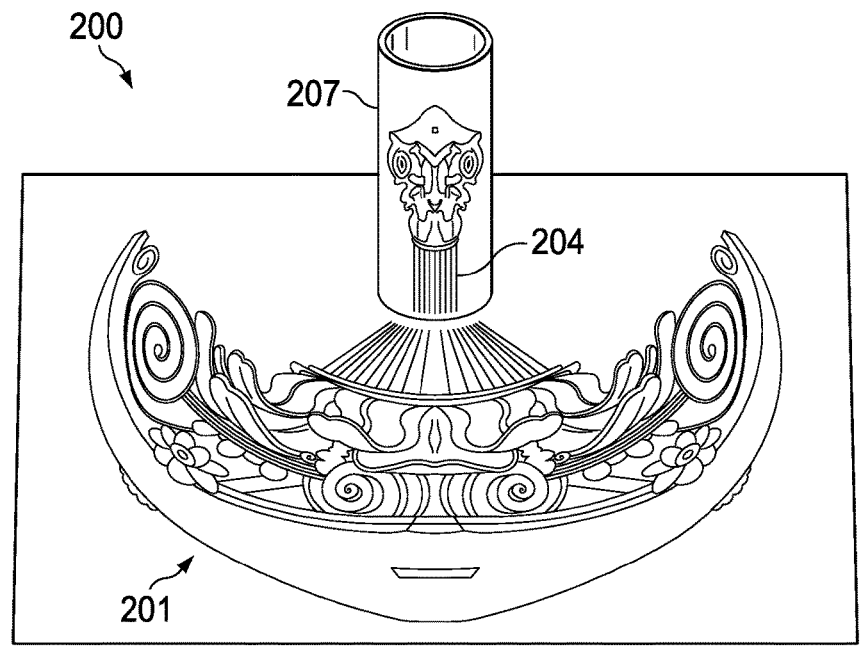
FIGS. 2A and 2B illustrate the concept of reflective anamorphosis.
Figure 2B:
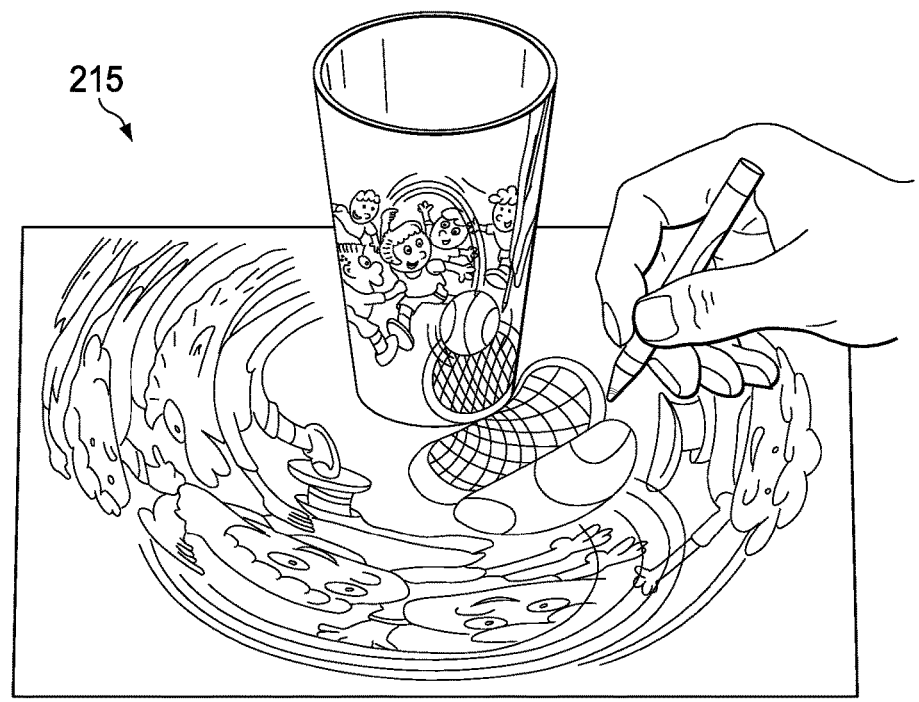

FIGS. 2A and 2B illustrate the concept of reflective anamorphosis. As shown in FIG. 2A, an illustration 200 shows a drawing sketch 201 when viewed with a cylindrical mirror 207. As can be seen here, the drawing sketch 201 is warped so that a substantially correct image 204 of an object appears in the cylindrical mirror 207. As shown in FIG. 2B, an illustration 215 shows a drawing sketch when viewed with a sliced conical-shaped mirror. Here, the sliced conical-shaped mirror projects an intended 3D image from a sketch drawn on a 2D drawing paper. An inverse reflective anamorphosis or "trompe l'oeil" is used in some embodiments of this disclosure, where a reflective head is attached to imaging optics of a seeker to capture a very wide field of view. Distortions are also corrected, such as computationally or optically, to recreate a true image of an object.

Figure 3:
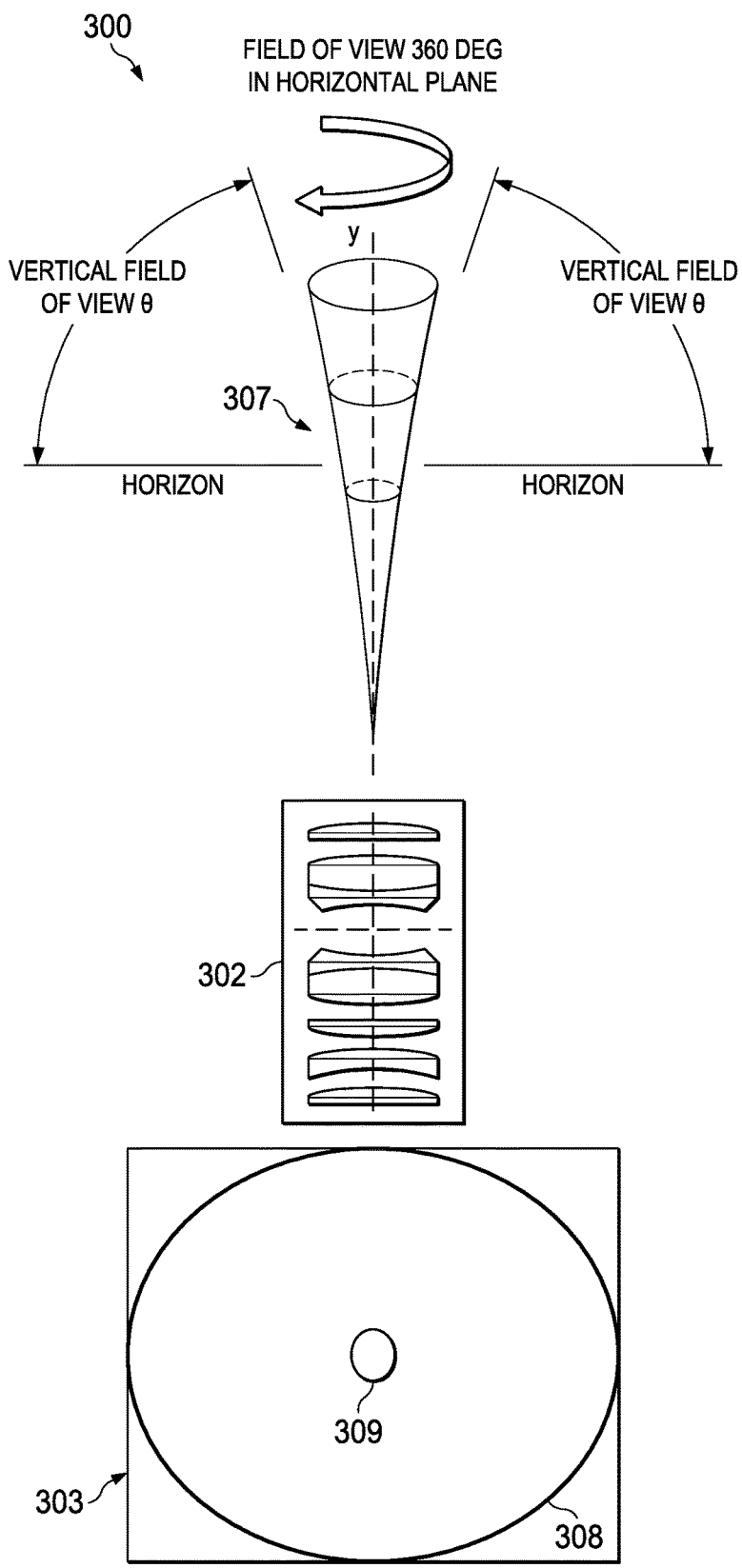
FIG. 3 illustrates an example of an ultra-wide field of view seeker.

FIG. 3 illustrates an example of an ultra-wide field of view seeker 300. As shown in FIG. 3, a reflective surface of rotation 307 is attached to or used in conjunction with an imaging lens group 302 of the seeker 300, which provides an image on a detector array 303. A region 308 denotes the region of interest, and the field of view is about 360° in the horizontal plane with a vertical field of view of θ degrees of solid angle. Another region 309 represents a central obscuration that can be corrected as described in more detail below.

The imaging lens group 302 represents any combination of optical element(s) that can direct, focus, or otherwise provide images onto the detector array 303. For example, the imaging lens group 302 could include multiple types of lenses that focus the field of view from the reflective surface of rotation 307 onto the detector array 303. Although not shown, the imaging lens group 302 could also include mirrors or any other optical elements.

The reflective surface of rotation 307 can be of any shape depending on the desired field of view. For example, the reflective surface of rotation 307 can be a concave surface, a straight inverted classical cone, a convex surface, a cylindrical surface, or other suitable surface. The characteristics of the reflective surface of rotation 307, such as the diameters of the curvatures, the length of the surface, or the radii at the vertex and at the bottom, can be tuned to match allocated space constraints in the seeker 300 and the desired field of view.

The reflective surface of rotation 307 (also called a reflective surface head) can be attached to or used in conjunction with the imaging lens group 302 in a variety of ways. For example, struts can be used to connect the surface of rotation 307 and the lens group 302, or the surface of rotation 307 can be bonded to the lens group 302 or assembled together with the lens group 302 in a glass tube or other tube. Other shapes of the reflective surface of rotation and supporting mechanisms will be recognized by one of ordinary skill in the art after review of this specification.

The seeker 300 and any of the variations described above do not require the use of a scanning or moving platform since a wide field of view is obtained using a stationary platform, simplifying the size, weight, and power requirements. As an alternative, a rotating reflective surface can be utilized, where just the reflective surface rotates to create a reflective surface of rotation and captures the wide field of view. As another alternative, instead of a 3D reflective surface of rotation 307, a thin curved or planar piece of reflective mirror can be rotated in the field on an axis to create a 3D reflective surface of rotation. The piece of reflective mirror could be mounted either parallel to or at an angle with the optical axis of the seeker. These alternate techniques using rotating reflective surfaces are better than conventional techniques since the power needed to rotate a thin film mirror reflector is substantially less than the power and structure required to rotate an entire imaging platform of the seeker used in conventional methods. The reflective surface can be of any shape that suits the needs of the application.

In the seeker 300, the look-direction of the seeker 300 is roughly orthogonal to the axis of the imaging optics. The reflective surface 307 provides for an ultra-wide field of view that nears 2π steradians, and the seeker 300 provides for one seamless image from horizon to θ degrees in elevation with complete azimuth. The image is distorted, but the distortion is mathematically predictable and therefore correctable.

Figure 4:
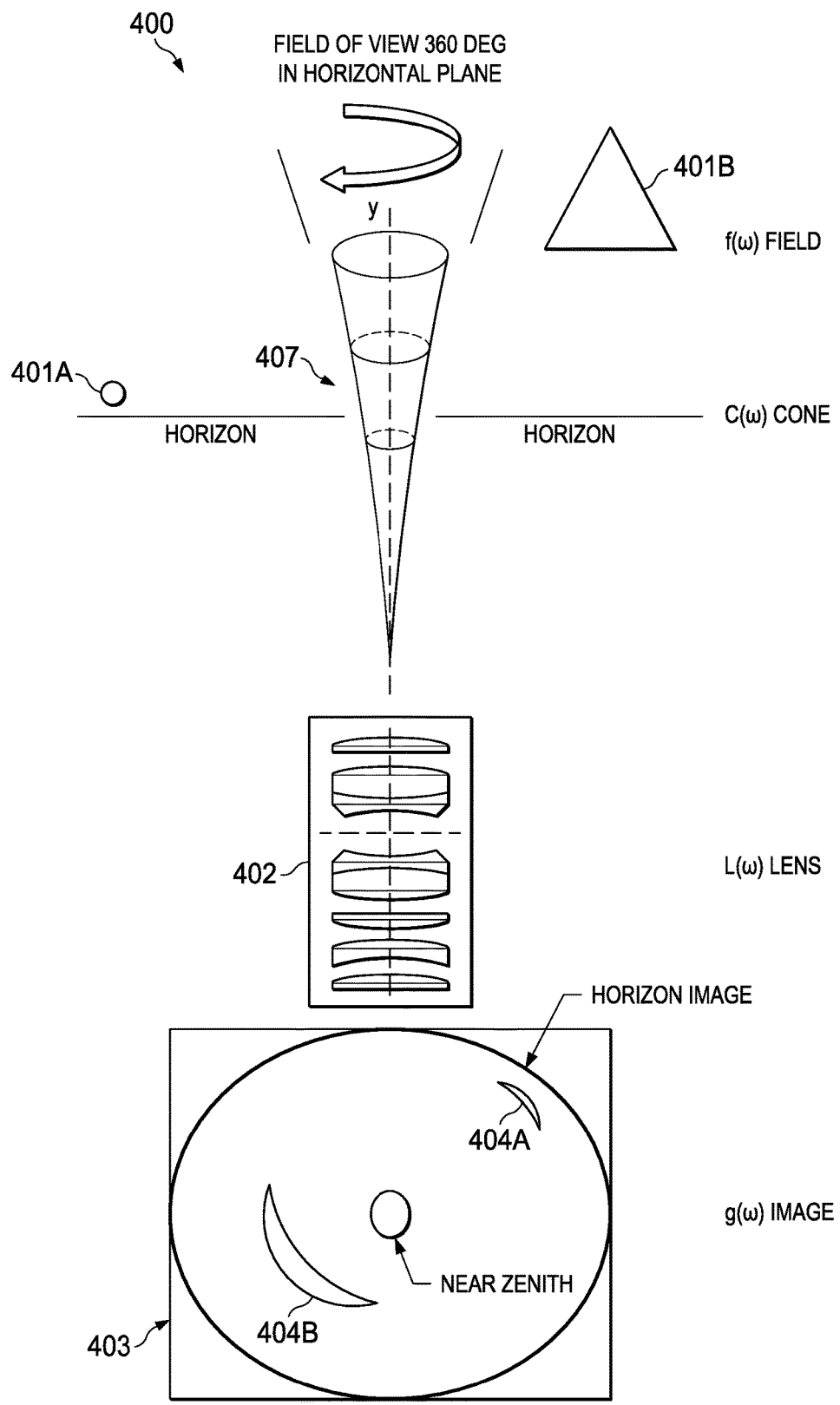
FIG. 4 illustrates an example of an ultra-wide field of view seeker using a concave reflector.

FIG. 4 illustrates an example of an ultra-wide field of view seeker 400 using a concave reflector. In FIG. 4, the seeker 400 shows an image distortion for two sample objects 401A-401B located in the ultra-wide field of view. A reflective surface of rotation 407 and an image lens group 402 form the optics of the seeker 400, and the seeker 400 includes an FPA 403. The sample object 401A is closer to the horizon and maps into an image 404A, and the sample object 401B maps into an image 404B. The horizon itself maps as a circle, and the near-zenith obscurity zone is shown.

Assume $f(\omega)$ represents the object field, $C(\omega)$ represents the reflective surface of rotation, and $L(\omega)$ represents the transfer function of the lens assembly. The image field $g(\omega)$ is given by:

$$g(\omega)=C(\omega)L(\omega)f(\omega)$$

The reflective surface and the image optics transformation functions are known beforehand, and the product $C(\omega)L(\omega)$ can be computed ahead of time. Based on this, the following can be obtained:

$$Y(\omega)=C(\omega)L(\omega)$$

$$f(\omega)=Y^{-1}g(\omega)$$

As illustrated above, a simple mathematical computation can retrieve the object function $f(\omega)$ in the field of view as $Y^{-1}$ can be computed ahead of time and is invariant for a given seeker.

If a simple straight cone or a sliced cone is used as a reflective surface, conventional projection mapping techniques can be used to remove distortions. An algorithm used to correct the distortion is a function of the reflective surface being used. Every pixel of the FPA 403 can correspond to (θ, Φ) in an object space, where θ is the object elevation from horizon and Φ is the angle of the object in the azimuth plane. This image transformation to remove distortion is much faster and easier to perform than conventional image stitching algorithms.

In some applications, the distorted image itself may be adequate for machine vision or image recognition purposes. In these cases, there may be no need to remove distortions caused by the reflective surfaces. These applications can create a library of target images based on the reflective surfaces used, and image recognition software can identify the targets without any additional real-time computations.

Figure 5:
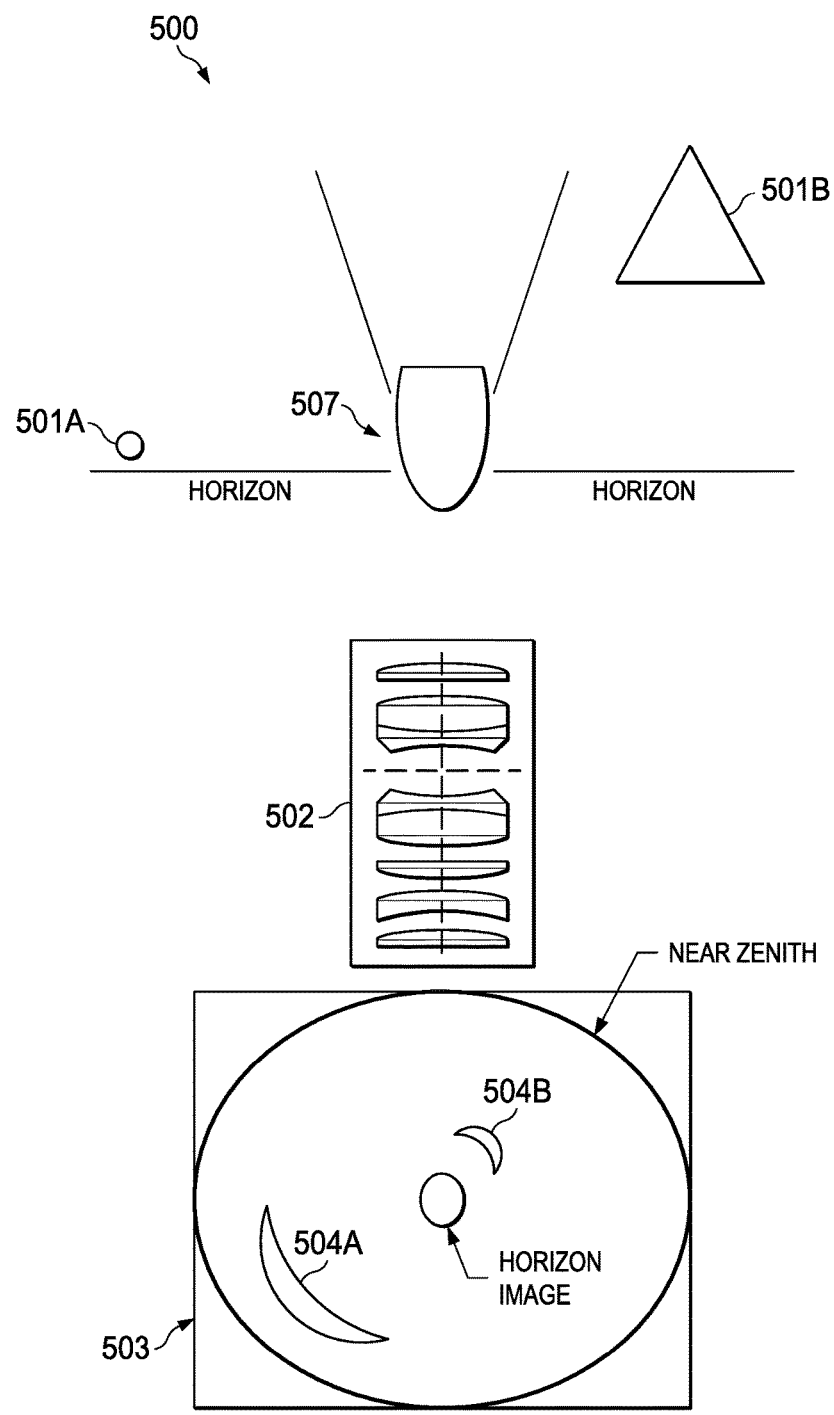
FIG. 5 illustrates an example of an ultra-wide field of view seeker using a convex reflector.

FIG. 5 illustrates an example of an ultra-wide field of view seeker 500 using a convex reflector. As shown in FIG. 5, the seeker 500 includes a convex reflector surface of rotation 507 as the first optical element that is attached to or used in conjunction with an imaging lens group 502. Any suitable support mechanisms could be used, such as struts or bonding in a glass tube or other tube. A detector array 503 can represent an FPA or other sensors.

FIG. 5 also illustrates how objects located in the ultra-wide field of view get mapped as images via the surface of rotation 507 and the imaging lens group 502. An object 501A gets mapped as an image 504A, and an object 501B gets mapped as an image 504B. When comparing the imaging characteristics of FIGS. 4 and 5, it is clear that image characteristics are personified based on their locations and the types of reflector used. The shape of the surface of rotation may emphasize one angular region of the object space or deemphasize another. A convex reflective surface of rotation could invert the location of the horizon and the obscuration. If the imaging emphasis needs to be for targets near the horizon, more concavity could be provided. On the other hand, if the imaging emphasis is for targets near the zenith, a convex reflector may help. Both reflectors provide the ultra-wide field of view for a seeker. Based on the application requirements, imaging emphasis can be tuned by appropriate selection of the reflector shape and size. Combinations of reflectors can also be used based on desired imaging characteristics and other constraints.

Figure 6:
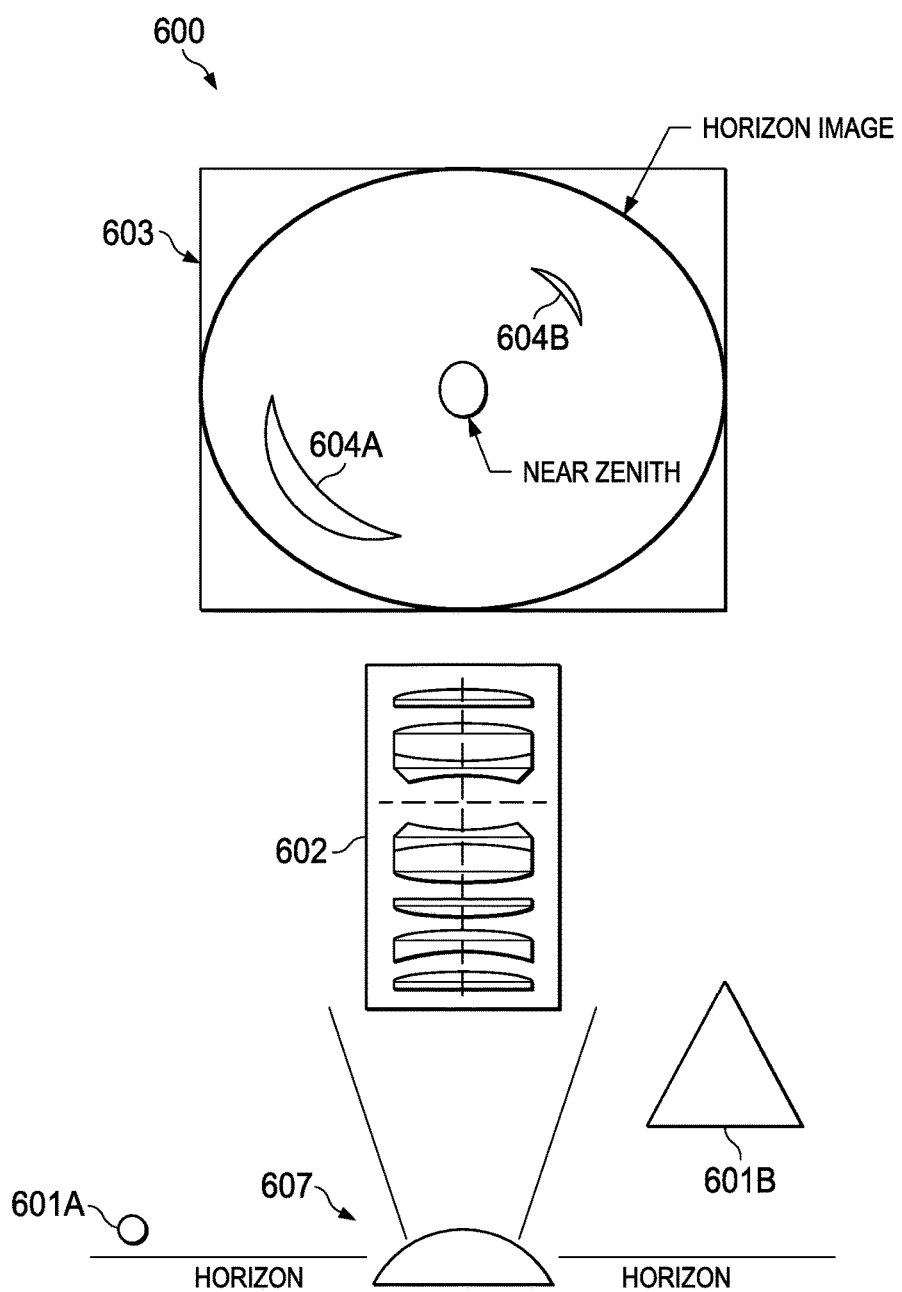
FIG. 6 illustrates an example of an ultra-wide field of view seeker using a sliced sphere reflector.

FIG. 6 illustrates an example of an ultra-wide field of view seeker 600 using a sliced sphere reflector. In FIG. 6, the seeker 600 has a piece of a spherical head reflector 607, where the reflector 607 is a sliced piece of a sphere containing a part of the surface of the sphere. The seeker 600 here is looking down onto the surface of rotation. This concept can be inverted if needed. Objects 601A-601B get imaged through the reflector head 607 and an imaging lens group 602 onto a detector array 603. The object 601A maps to an image 604A, and the object 601B maps to an image 604B. FIG. 6 also illustrates how the horizon and the near zenith get mapped with this type of reflective head.

Figure 7:
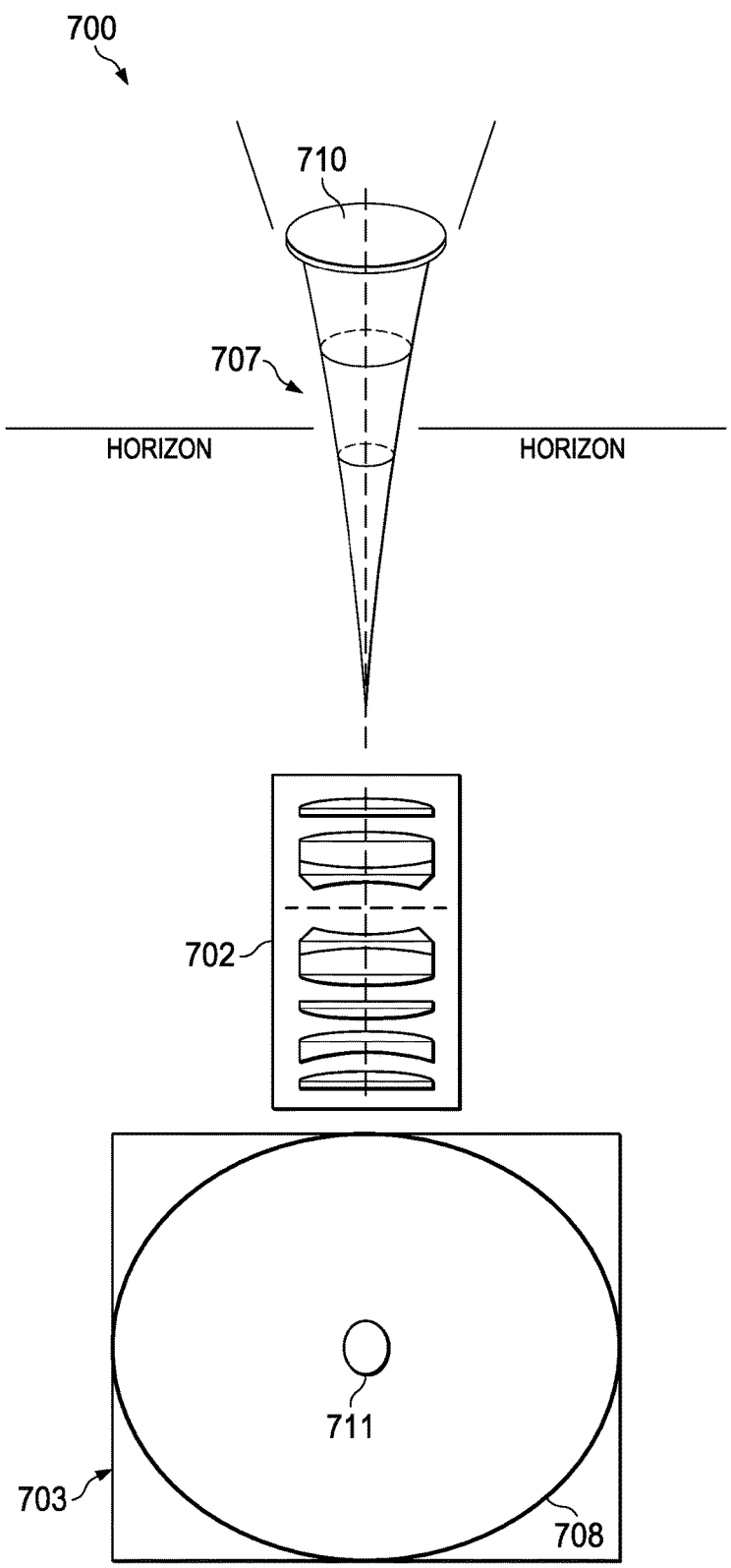
FIG. 7 illustrates an example use of a refractive tip on a reflector head to eliminate central obscuring in an ultra-wide field of view seeker.

FIG. 7 illustrates an example use of a refractive tip 710 on a reflector head to eliminate central obscuring in an ultra-wide field of view seeker 700. Here, the central obscure regions can be avoided and brought under the ultra-wide field of view by adding refractive optics at the tip 710 of the reflector head. In the illustrated seeker 700, one or more refractive elements at the tip 710 (such as a convex lens as shown) can be placed on top of a reflective surface of rotation 707 and mounted to an imaging lens group 702 to image on a detector array 703. The previously-obscure region is now an image region 711. Upper and lower diameters of the concave surface of rotation 707 can be varied based on the application needs to impact the size of the obscure region.

Although not shown in FIGS. 3 through 7, the back-end support electronics 105 described above could be used to process data from the detector array in a seeker. The support electronics 105 could perform any needed or desired functions. For example, the support electronics 105 could execute or otherwise support an algorithm that corrects for distortions in images captured by the detector array. The support electronics 105 could also perform guidance and control functions for a warhead or other ordinance. The support electronics 105 include any suitable analog or digital components that perform desired functions in or with a seeker, such as one or more microprocessors, microcontrollers, digital signal processors, application specific integrated circuits, field programmable gate arrays, or discrete logic devices.

One can use any reflector or combination of reflectors shown in any of the embodiments above in addition to using other shapes of reflectors not shown here. Also, the characteristics of these reflectors (such as radii of curvatures, characteristics of the surface curves, the length of the reflective head, and the mounting height from the lens group) can be varied and tailored based on the application needs and the allocated space, weight, and power constraints. As illustrated in FIG. 7, refractive optics can be added to a reflective surface head to enhance or focus on certain areas of the ultra-wide field of view. The basic structure shown in FIG. 4 can be adjusted to tailor to the shape of the reflector shown in other figures and for shapes and combinations of reflector types not shown here. After reviewing this disclosure, one of ordinary skill in the art will know how to modify the structures illustrated here for other types of reflectors.

The various embodiments and figures described in this disclosure can also be used to describe various methods of making an ultra-wide field of view seeker. For example, the reflective surface of rotation can be assembled as the first optical element, followed by the imaging lens group, and followed by the detector array and the back-end electronics in that order. A refractive optics tip can be added as shown in FIG. 7 as a final step or assembled as part of the reflective surface of rotation. The reflective surface head and the lens assembly, along with the detector assembly, can be mounted on a platform if desired. Although the platform can be stationary when used with a reflective surface of rotation, the imaging assembly can also be mounted on a moving platform to vary the emphasis of the angular orientations of the field of view or to bring a specific type reflector to an angular orientation of interest. Variations and combinations of the techniques taught here are considered to be part of this disclosure.

Modifications, additions, or omissions may be made to the systems, apparatuses, and methods described here without departing from the scope of this disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, the applicant notes that it does not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. An ultra-wide field of view seeker comprising:
    a reflective surface of rotation having a curved reflective surface that is radially symmetrical about an axis of symmetry, the axis of symmetry being parallel to an optical axis of the seeker, the reflective surface of rotation providing a field of view of approximately $2\pi$ steradians except for a region of obscurity about the axis of symmetry;
    an image detector configured to capture images of the field of view; and an imaging lens group configured to provide the images of the field of view from the reflective surface of rotation onto the image detector.

2. The seeker of claim 1, further comprising:
one or more refractive optical elements at an end of the reflective surface of rotation, the one or more refractive optical elements configured to at least partially reduce the region of obscurity caused by the reflective surface of rotation.

3. The seeker of claim 1, wherein the curved reflective surface of the reflective surface of rotation includes a concave surface.

4. The seeker of claim 1, wherein the curved reflective surface of the reflective surface of rotation includes a convex surface.

5. The seeker of claim 1, wherein the curved reflective surface of the reflective surface of rotation includes a cylindrical surface.

6. The seeker of claim 1, wherein the curved reflective surface of the reflective surface of rotation includes an inverted straight cone.

7. The seeker of claim 1, wherein the curved reflective surface of the reflective surface of rotation includes a slice of a sphere containing an outer curved surface that faces the imaging lens group.

8. The seeker of claim 1, wherein the curved reflective surface of the reflective surface of rotation includes at least one reflective surface that is rotatable around an optical axis of the imaging lens group.

9. A system comprising:
a seeker comprising:
a reflective surface of rotation having a curved reflective surface that is radially symmetrical about an axis of symmetry, the axis of symmetry being parallel to an optical axis of the seeker, the reflective surface of rotation providing a field of view of approximately $2\pi$ steradians except for a region of obscurity about the axis of symmetry;
an image detector configured to capture images of the field of view; and
an imaging lens group configured to provide the images of the field of view from the reflective surface of rotation onto the image detector; and
at least one processing device configured to process the captured images.

10. The system of claim 9, wherein:
the reflective surface of rotation is configured to distort the field of view in the captured images; and
the at least one processing device is configured to remove distortions in the captured images caused by the reflective surface of rotation.

11. The system of claim 10, wherein the at least one processing device is configured to remove the distortions in the captured images using inverse reflective anamorphosis.

12. The system of claim 9, wherein the seeker further comprises one or more refractive optical elements at an end of the reflective surface of rotation, the one or more refractive optical elements configured to at least partially reduce the region of obscurity caused by the reflective surface of rotation.

13. The system of claim 9, wherein the curved reflective surface of the reflective surface of rotation includes at least one of: a concave surface, a convex surface, a cylindrical surface, an inverted straight cone, and a slice of a sphere containing an outer curved surface that faces the imaging lens group.

14. The system of claim 9, wherein the curved reflective surface of the reflective surface of rotation includes at least one reflective surface that is rotatable around an optical axis of the imaging lens group.

15. A method of using an ultra-wide field of view seeker, the method comprising:
receiving reflected light from a curved reflective surface of a reflective surface of rotation, the curved reflective surface being radially symmetrical about an axis of symmetry, the axis of symmetry being parallel to an optical axis of the seeker, the reflective surface of rotation providing a field of view of approximately $2\pi$ steradians except for a region of obscurity about the axis of symmetry;
passing the reflected light through an imaging lens group to generate images of the field of view; and
capturing the images of the field of view using an image detector.

16. The method of claim 15, wherein:
the reflective surface of rotation is configured to distort the field of view in the captured images; and
the method further comprises removing distortions in the captured images caused by the reflective surface of rotation.

17. The method of claim 16, wherein removing the distortions in the captured images comprises using inverse reflective anamorphosis.

18. The method of claim 15, wherein one or more refractive optical elements at an end of the reflective surface of rotation at least partially reduce the region of obscurity caused by the reflective surface of rotation.

19. The method of claim 15, wherein the curved reflective surface of the reflective surface of rotation includes at least one of: a concave surface, a convex surface, a cylindrical surface, an inverted straight cone, and a slice of a sphere containing an outer curved surface that faces the imaging lens group.

20. The method of claim 15, wherein the curved reflective surface of the reflective surface of rotation includes at least one reflective surface that is rotatable around an optical axis of the imaging lens group.

* * * * *